(12) United States Patent
Huang et al.

(10) Patent No.: US 8,867,611 B2
(45) Date of Patent: Oct. 21, 2014

(54) VIDEO TRANSMITTING METHOD AND SYSTEM WITH IMAGE QUALITY ADJUSTING FUNCTION

(75) Inventors: Wei-Cheng Huang, New Taipei (TW); Mei-Yi Tsai, New Taipei (TW); Hsuan-Che Chien, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 666 days.

(21) Appl. No.: 13/241,156

(22) Filed: Sep. 22, 2011

(65) Prior Publication Data

US 2012/0314759 A1 Dec. 13, 2012

(30) Foreign Application Priority Data

Jun. 10, 2011 (TW) .............................. 100120400 A

(51) Int. Cl.
*H04N 7/12* (2006.01)
*H04N 21/2343* (2011.01)
*H04N 21/238* (2011.01)

(52) U.S. Cl.
CPC ... *H04N 21/2343* (2013.01); *H04N 21/234381* (2013.01); *H04N 21/23805* (2013.01); *H04N 21/234363* (2013.01)
USPC ............. 375/240.02; 375/240.25; 375/240.26

(58) Field of Classification Search
CPC .................. H04N 19/00781; H04N 19/00169; H04N 19/00266; H04N 19/0009; H04N 19/00181; H04N 19/00193; H04N 19/00278; H04N 19/00369; H04N 19/00127; H04N 19/00157; H04N 19/00175; H04N 19/002; H04N 19/00206; H04N 19/00236; H04N 19/00284; H04N 19/0003; H04N 19/0006; H04N 19/00066; H04N 19/00096; H04N 19/00151; H04N 19/00187; H04N 19/00563; H04N 19/00593; H04N 19/00757; H04N 19/00969; H04N 21/23805; H04N 21/233; H04N 21/23418; H04N 21/234363; H04N 21/234381; H04N 21/2402; H04N 21/242; H04N 21/2662; H04N 21/6125; H04N 21/812; H04N 21/84; H04N 21/21; H04N 21/23; H04N 21/23406; H04N 21/2343; H04N 21/234327; H04N 21/234345; H04N 21/234354; H04N 21/23439; H04N 21/26613; H04N 21/43637; H04N 21/44209; H04N 21/4425; H04N 21/4728; H04N 21/6379; H04N 21/64792; H04N 7/26058; H04N 7/26888; H04N 7/50; H04N 7/26244; H04N 7/26377; H04N 7/30; H04N 7/147; H04N 7/26117; H04N 7/26313
USPC ........................................ 375/240.01–240.29
See application file for complete search history.

(56) References Cited

U.S. PATENT DOCUMENTS

| | | | |
|---|---|---|---|
| 6,778,254 B2 | 8/2004 | Honda | |
| 8,199,833 B2 * | 6/2012 | Bennett | ..................... 375/240.28 |
| 2010/0121901 A1 * | 5/2010 | Sumiyoshi | ..................... 709/201 |
| 2011/0292981 A1 | 12/2011 | Kihara et al. | |

FOREIGN PATENT DOCUMENTS

| | | |
|---|---|---|
| EP | 2229001 A1 | 9/2010 |
| JP | 2011-114444 A | 6/2011 |

* cited by examiner

*Primary Examiner* — Sath V Perungavoor
*Assistant Examiner* — Nathnael Aynalem
(74) *Attorney, Agent, or Firm* — CKC & Partners Co., Ltd.

(57) ABSTRACT

A video transmitting method with an image quality adjusting function is provided. In the method, a video stream is transmitted to a receiving terminal. A received number of frames of the video stream received by the receiving terminal in a preset period is obtained. An image quality of the video stream is adjusted according to the received number of frames.

28 Claims, 7 Drawing Sheets

VIDEO TRANSMITTING METHOD AND SYSTEM WITH IMAGE QUALITY ADJUSTING FUNCTION

RELATED APPLICATIONS

This application claims priority to Taiwan Application Serial Number 100120400, filed Jun. 10, 2011, which is herein incorporated by reference.

BACKGROUND

1. Technical Field

The present invention relates to a video transmitting method and system. More particularly, the present invention relates to a video transmitting method and system with an image quality adjusting function.

2. Description of Related Art

Websites for sharing videos are becoming more and more popular in recent times, and it is becoming a trend to upload and share filmed videos on the Internet. As image technology develops, videos with better quality can be uploaded and shared with others, and users tend to prefer watching videos with better image quality.

Videos with better image quality often have large data sizes. Hence, more network bandwidth is required to transmit videos with higher image quality. In other words, if there is insufficient bandwidth for transmission, a receiving terminal cannot play received videos smoothly in real-time. If the image quality of a video is reduced to enable smooth playing, users may not be satisfied. Even when there is sufficient bandwidth for transmission, if compression parameters of the videos are not adjusted appropriately, the number of frames received by receiving terminals may be low to thereby result in poor image quality.

SUMMARY

According to one embodiment of this invention, a video transmitting method with an image quality adjusting function is provided to adjust the image quality of a transmitted video stream according to the number of frames received by a receiving terminal in a preset period. In the video transmitting method, a video stream is transmitted to a receiving terminal. A received number of frames of the video stream received by the receiving terminal in a preset period is determined. The image quality of the video stream is adjusted according to the received number of frames.

According to another embodiment of this invention, a video transmitting system with an image quality adjusting function is provided. In the video transmitting system, the image quality of a transmitted video stream is adjusted according to the number of frames received by a receiving terminal in a preset period. The video transmitting system includes a receiving terminal, a transmitting terminal and a frame-number processing module. A first control unit of the transmitting terminal includes a connection module and an image-quality control module. The connection module establishes a connection with the receiving terminal through a data transmission interface and transmits a video stream to the receiving terminal. The image-quality control module adjusts an image quality of the transmitted video stream. The frame-number processing module includes an adjusting sub-module for driving the image-quality control module of the transmitting terminal to adjust the image quality of the video stream according to a received number of frames of the video stream received by the receiving terminal in a preset period.

The present invention can achieve many advantages. A determination may be made as to whether the number of frames is sufficient according to the received number of frames of the transmitted video stream received by the receiving terminal in a preset period, and the image quality of the transmitted video stream can be dynamically adjusted according to the result thereof. When the received number of frames is determined to be insufficient, the image quality of the transmitted video stream can be reduced to decrease the required transmission bandwidth. Hence, the receiving terminal can receive the video stream normally, which leads to smooth real-time playing of the video stream. When the received number of frames is determined to be sufficient, the image quality of the transmitted video stream can be enhanced, which can provide users of the receiving terminal a better watching experience. In addition, image quality adjustment may be realized without having to ascertain the available bandwidth for transmission, such that better image quality can be provided to users without causing delay during playing of the video stream in real-time.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
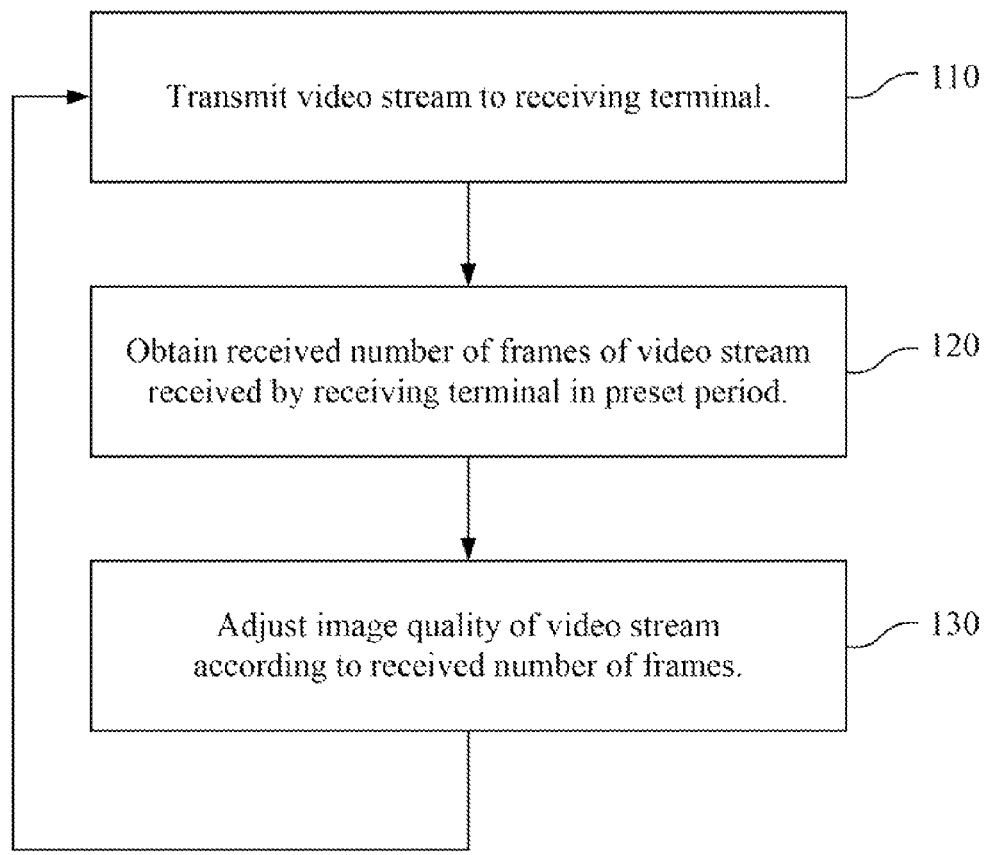
FIG. 1 is a flow diagram of a video transmitting method with an image quality adjusting function according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, a flow diagram will be described that illustrates a video transmitting method with an image quality adjusting function according to one embodiment of this invention. In the video transmitting method, the image quality of a transmitted video stream is adjusted according to the number of frames received by a receiving terminal in a preset period. The video transmitting method may take the form of a computer program product stored on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives (HDD) and floppy disk drives.

The routine 100 begins at operation 110, where a video stream is transmitted to a receiving terminal. The video stream can be transmitted through a network to execute operation 110. The receiving terminal may be a computer or any other electronic apparatus, which can process the video stream.

From operation 110, the routine 100 continues to operation 120, where a received number of frames of the video stream received by the receiving terminal in a preset period is obtained.

The routine 100 continues to operation 130, where an image quality of the video stream is adjusted according to the received number of frames. Operations 110-130 are repeated so that the image quality of the transmitted video stream is continuously adjusted. In greater detail, the adjustment of operation 130 may include reducing or enhancing the image quality of the video stream. The image quality of the video stream may be adjusted in terms of its resolution, compressed ratio (CR), frame rate, size of group of pictures, or a combination thereof, or any other image quality related parameter and combinations thereof. Therefore, whether the number of frames is sufficient or not can be determined according to the received number of frames of the video stream received by the receiving terminal in a preset period, and the image quality of the transmitted video stream can be adjusted according to the result thereof.

In the first embodiment of this invention, the image quality of the video stream can be adjusted by adjusting the CR and the resolution of the video stream. Hence, the operation of reducing the image quality of the video stream may include determining if the present CR of the video stream is equal to a CR minimum of the present resolution of the video stream. When the present CR is not equal to the CR minimum of the present resolution, the present CR of the video stream is decreased. When the present CR is equal to the CR minimum of the present resolution, the present resolution of the video stream is decreased and the present CR is adjusted to reduce the transmitted video data size of the video stream. The bandwidth required for transmitting the video stream after resolution reduction and CR adjustment is less than that for transmitting the video stream before reduction and adjustment thereof.

When enhancing the resolution of the video stream, the Intra-frame (I frame) size of the video stream after resolution enhancement may be further taken into consideration. Hence, the operation of enhancing the image quality of the video stream may include determining if the present CR of the video stream is equal to a CR maximum of the present resolution of the video stream. When the present CR is not equal to the CR maximum, the present CR of the video stream is increased. When the present CR is equal to the CR maximum, the present resolution of the video stream is increased and the present CR is adjusted. Subsequently, a first I frame data size before increasing the present resolution and adjusting the present CR is substantially equal to a second I frame data size after such increasing and adjustment. Therefore, the situation in which there is insufficient bandwidth for transmitting the I frame, the data size of which may be increased significantly after the resolution augmentation and CR adjustment, can be avoided, and the transmitted video stream can be played smoothly.

Figure 2:
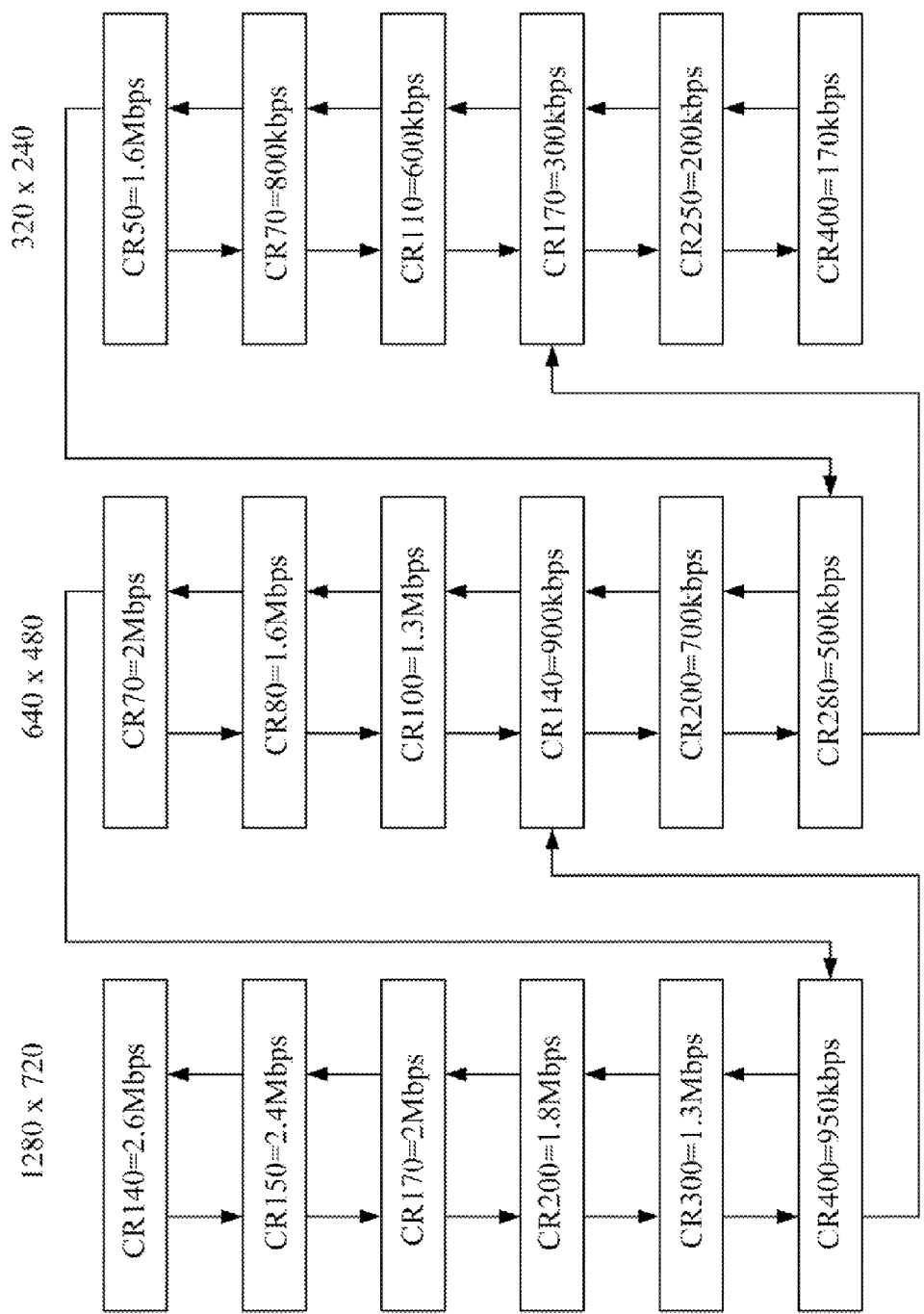
FIG. 2 is an embodiment of an image-setting table.

In the second embodiment of this invention, the image quality of the video stream can be adjusted according to the result of referencing a table. Hence, the operation of adjusting the image quality of the video stream according to the received number of frames may include referencing an image-setting table according to the received number of frames and the present image setting of the video stream to obtain an image adjustment setting. The image adjustment setting may include a resolution setting, a CR setting, a frame rate setting, a group of pictures (GOP) size setting, or a combination thereof of the video stream. When the transmitted video stream is adjusted according to the CR and resolution settings, the image-setting table can be designed according to the first embodiment. Referring to FIG. 2, an embodiment of the image-setting table will be described. There are resolutions 1280×720, 640×480 and 320×240 illustrated in FIG. 2. CR70 represents a CR of 1/70, which means the compressed data is 1/70th the size of the original data. Likewise, CR400 represents a CR of 1/400. As the resolutions differ, the corresponding CR maximum and CR minimum also differ. Taking the resolution of 640×480 as an example, CR70 is the corresponding CR maximum and CR280 is the corresponding CR minimum. Hence, if the image quality of the video stream should be reduced and the present image setting of the video stream is CR70 at resolution 640×480 (which is not the CR minimum at resolution 640×480), the resolution of the video stream may be maintained at 640×480, and the present CR of the video stream may be reduced from CR70 to CR80 according to the image-setting table in FIG. 2. If the image quality of the video stream should be reduced and the present image setting of the video stream is CR280 at resolution 640×480 (which is the CR minimum at resolution 640×480), the resolution of the video stream may be reduced to 320×240, and the present CR of the video stream may be adjusted from CR280 to CR170 according to the image-setting table in FIG. 2, such that the required transmission bandwidth may be reduced from 500 kbps to 300 kbps.

If the image quality of the video stream should be enhanced and the present image setting of the video stream is CR80 at resolution 640×480 (which is not the CR maximum at resolution 640×480), the resolution of the video stream may maintain at 640×480, and the present CR of the video stream may be increased from CR80 to CR70 according to the image-setting table in FIG. 2. If the image quality of the video stream should be enhanced and the present image setting of the video stream is CR70 at resolution 640×480 (which is the CR maximum at resolution 640×480), the resolution of the video stream may be increased to 1280×720, and the present CR of the video stream may be adjusted from CR70 to CR400 according to the image-setting table in FIG. 2. I frame data size of the video stream under CR70 at resolution 640×480 is substantially equal to that under CR400 at resolution 1280×720. Hence, the situation in which there is insufficient bandwidth for transmitting the I frame, the data size of which may be increased significantly after the resolution augmentation and CR adjustment, can be avoided, and the transmitted video stream can be played smoothly. In other embodiments, the image-setting table can be configured with different combinations of resolution, CR, frame rate or GOP size to be referenced for the image-quality adjustment, which should not be limited in this disclosure.

Figure 3:
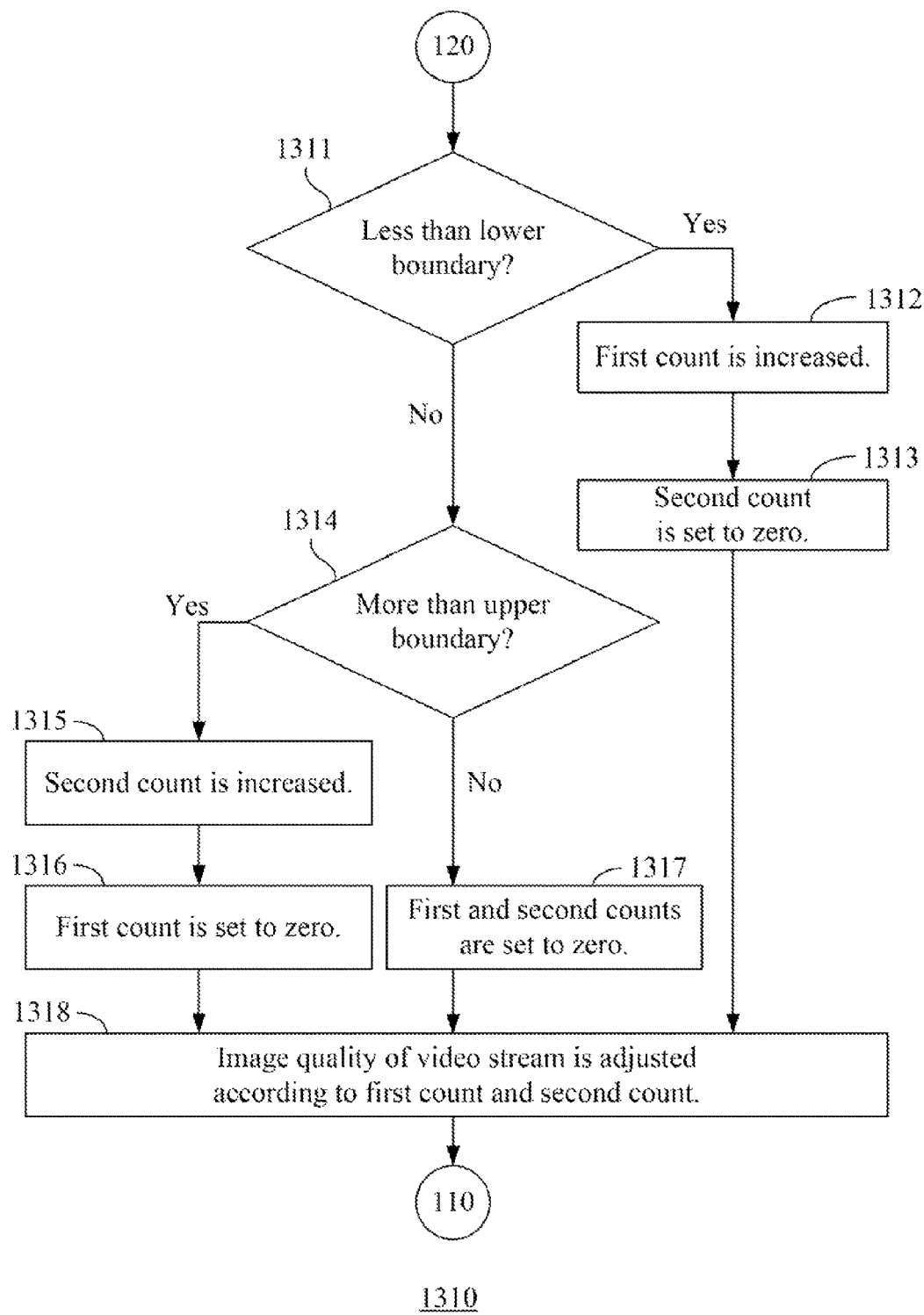
FIG. 3 is a flow diagram of an embodiment of adjusting the image quality of a video stream according to the received number of frames.

In one embodiment of operation 130, several counts may be utilized as a basis for adjusting the image quality of the video stream. FIG. 3 is a flow chart of an embodiment of adjusting the image quality of a video stream according to the received number of frames (operation 130 in FIG. 1). Hence, operation 130 may include the routine 1310 which begins at operation 1311, where a determination is made as to whether the received number of frames is less than a lower boundary for the number of frames. If the received number of frames is less than the lower boundary, the routine 1310 branches to operation 1312.

At operation 1312, when the received number of frames is less than the lower boundary, a first count is increased. From operation 1312, the routine 1310 may continue to 1313, where a second count may be set to zero when the first count is increased.

Subsequently, at operation 1318, the image quality of the transmitted video stream is adjusted according to the first count and the second count, after which the routine 1310 of operation 130 continues to operation 110 of the routine 100 to continue adjusting the image quality of the transmitted video stream. The image quality of the video stream to be adjusted may include resolution, CR, frame rate, GOP size, or a combination thereof, or any other image-quality related parameter of the video stream and combinations thereof.

If, at operation 1311, the received number of frames is not less than the lower boundary, the routine 1310 continues to operation 1314, where a determination is made as to whether the received number of frames is more than an upper boundary for the number of frames. If the received number of frames is not more than the upper boundary for the number of frames, the routine 1310 continues to operation 1318, where the image quality of the transmitted video stream is adjusted according to the first count and the second count. If the received number of frames is not less than the lower boundary and not more than the upper boundary, this may indicate that the present image quality of the video stream is suitable for transmission using the present transmission bandwidth. Hence, in some embodiments, when the received number of frames is not more than the upper boundary, the routine 1310 may continue to operation 1317, where the first count and the second count are set to zero, after which the routine 1310 continues to operation 1318, described above.

If, at operation 1314, the received number of frames is more than the upper boundary, the routine 1310 branches to operation 1315, where the second count is increased. From operation 1315, the routine 1310 continues to operation 1316, where the first count is set to zero. Therefore, the first count and the second count may respectively represent the continuous count numbers with insufficient and sufficient transmitted number of frames by the set-to-zero operations 1313, 1316 and 1317.

Subsequently, at operation 1318, the image quality of the transmitted video stream is adjusted according to the first count and the second count. Hence, whether the receiving terminal has received a sufficient number of frames or not can be determined according to the first count and the second count for adjusting the image quality of the transmitted video stream. In other embodiments of this invention, the determination in operation 1314 may be executed before operation 1311, or operations 1311 and 1314 may be executed at the same time, which should not be limited in this disclosure. In some embodiments, the upper boundary or the lower boundary for the number of frames can be adjusted dynamically.

When the first count is increased to a larger value, this may mean that the present bandwidth is insufficient for transmitting the video stream with the present image quality setting, and the image quality of the transmitted video stream should be reduced to decrease the required transmission bandwidth. Hence, the image quality of the transmitted video stream is adjusted according to the first count and the second count (operation 1318), and this may include reducing the image quality of the transmitted video stream when the first count is more than a first count threshold. Therefore, when the transmission bandwidth is continuously insufficient for transmitting the video stream with the present image quality setting, the image quality of the video stream can be reduced to decrease the required transmission bandwidth. Subsequently, the receiving terminal can receive the video stream normally, which leads to smooth real-time playing of the video stream.

When the second count is increased to a larger value, this may mean that the present bandwidth is sufficient for transmitting the video stream with the present image quality setting, and the image quality of the transmitted video stream can be enhanced to provide users a better watching experience. Hence, the image quality of the transmitted video stream is adjusted according to the first count and the second count (operation 1318), and this may include enhancing the image quality of the transmitted video stream when the second count is more than a second count threshold. Therefore, when the transmission bandwidth is continuously sufficient for transmitting the video stream with the present image quality setting, the image quality of the video stream can be enhanced to provide users of the receiving terminal a better watching experience.

When the received number of frames is not obtained for a period of time, this may indicate that a transmission error has occurred. Hence, in one embodiment of this invention, the first count can be increased when the received number of frames is not obtained for a period of time. Subsequently, when the first count is more than the first count threshold, the image quality of the transmitted video stream can be reduced. In another embodiment of this invention, the received number of frames can be set to zero when the received number of frames is not obtained for a period of time, such that the received number of frames would be less than the lower boundary for the number of frames and the first count would be increased. Therefore, the required bandwidth for transmitting the video stream can be reduced when the received number of frames is not obtained for a period of time.

Figure 4:
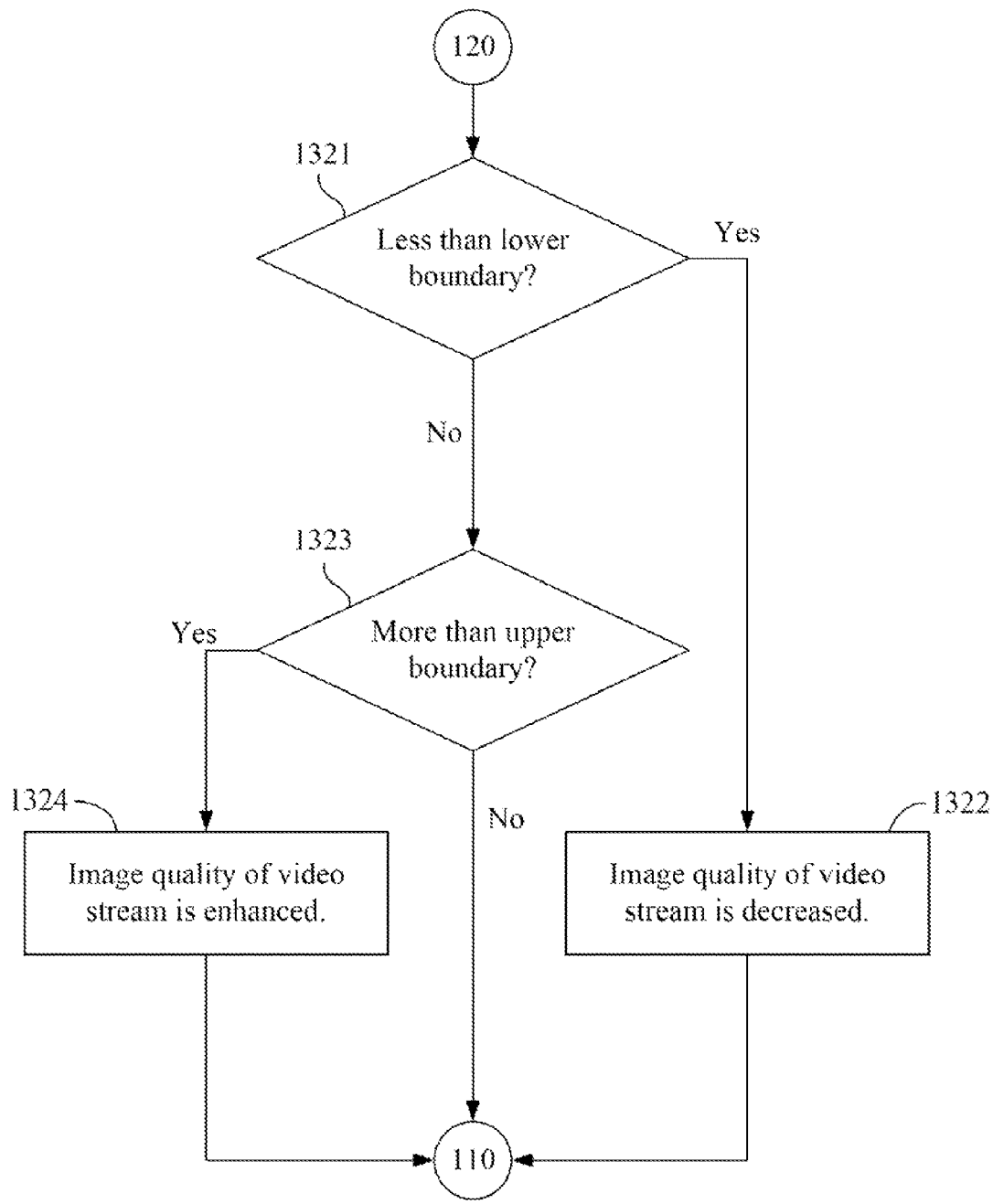
FIG. 4 is a flow diagram of another embodiment of adjusting the image quality of a video stream according to the received number of frames.

In another embodiment of operation 130, a determination is made with respect to whether the received number of frames is more than the upper boundary or less than the lower boundary for the image quality adjustment. FIG. 4 is a flow chart of another embodiment of adjusting the image quality of a video stream according to the received number of frames (operation 130 in FIG. 1). Hence, operation 130 may include the routine 1320 which begins at operation 1321, where a determination is made as to whether the received number of frames is less than a lower boundary for the number of frames. If the received number of frames is less than the lower boundary, the routine 1320 branches to operation 1322.

At operation 1322, when the received number of frames is less than the lower boundary, the image quality of the transmitted video stream is reduced, and the routine 1320 of operation 130 continues to operation 110 of the routine 100 to continue adjusting the video stream.

If, at operation 1321, the received number of frames is not less than the lower boundary, the routine 1320 continues to operation 1323, where a determination is made as to whether the received number of frames is more than an upper boundary for the number of frames. If the received number of frames is not more than the upper boundary, the routine 1320 of operation 130 continues to operation 110 of the routine 100 to continue adjusting the video stream.

If, at operation 1323, the received number of frames is more than the upper boundary, the routine 1320 branches to operation 1324, where the image quality of the transmitted video stream is enhanced, after which the routine 1320 of operation 130 continues to operation 110 of the routine 100 to continue adjusting the video stream. Therefore, the image quality of the transmitted video stream can be adjusted dynamically according to the received number of frames. In other embodiments of this invention, the determination in operation 1323 may be executed before operation 1321, or operations 1321 and 1323 may be executed at the same time, which should not be limited in this disclosure. In some embodiments, the upper boundary or the lower boundary for the number of frames can be adjusted dynamically.

Figure 5:
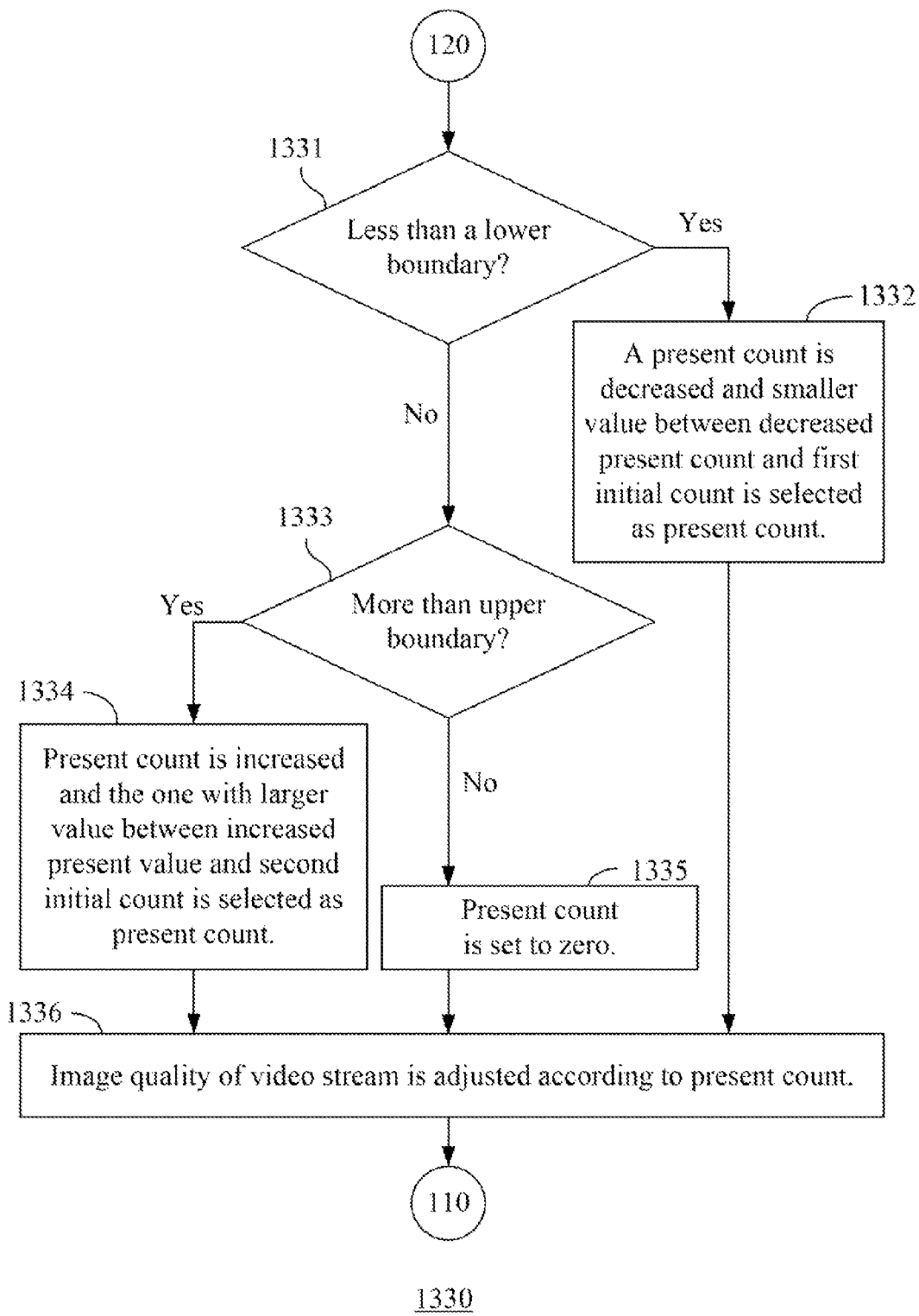
FIG. 5 is a flow diagram of another embodiment of adjusting the image quality of a video stream according to the received number of frames.

In another embodiment of operation 130, the image quality of the video stream can be adjusted according to a single count number. FIG. 5 is a flow chart of another embodiment of adjusting the image quality of a video stream according to the received number of frames (operation 130 in FIG. 1). Hence, operation 130 may include the routine 1330 which begins at operation 1331, where a determination is made as to whether the received number of frames is less than a lower boundary for the number of frames. If the received number of frames is less than the lower boundary, the routine 1330 branches to operation 1332.

At operation 1332, when the received number of frames is less than the lower boundary, a present count is decreased and the smaller value between the decreased present count and a first initial count is selected as the present count. From operation 1332, the routine 1330 continues to operation 1336, where the image quality of the video stream is adjusted according to the present count.

If, at operation 1331, the received number of frames is not less than the lower boundary, the routine 1330 continues to operation 1333, where a determination is made as to whether the received number of frames is more than an upper boundary for the number of frames. If the received number of frames is not more than the upper boundary, the routine 1330 continues to operation 1336, where the image quality is adjusted according to the present count. In some embodiments, if the received number of frames is not less than the lower boundary and not more than the upper boundary, the present image quality of the video stream may be suitable for transmission using the present transmission bandwidth. Hence, if the received number of frames is not more than the upper boundary, the routine 1330 may continue to operation 1335, where the present count is set to zero.

If, at operation 1333, the received number of frames is more than the upper boundary, the routine 1330 branches to operation 1334, where the present count is increased and the larger value between the increased present value and a second initial count is selected as the present count. Subsequently, the routine 1330 continues to operation 1336, where the image quality is adjusted according to the present count. Therefore, whether the receiving terminal receives a sufficient number of frames in a period of time can be determined according to the present count for adjusting the image quality of the video stream. In other embodiments of this invention, the determination in operation 1333 may be executed before operation 1331, or operations 1331 and 1333 may be executed at the same time, which should not be limited in this disclosure. In some embodiments, the upper boundary or the lower boundary for the number of frames can be adjusted dynamically.

When the present count is decreased to a smaller value, this may mean that the present bandwidth is insufficient for transmitting the video stream with the present image quality setting, and the image quality of the transmitted video stream should be reduced to decrease the required transmission bandwidth. Hence, the image quality of the transmitted video stream is adjusted according to the present count (operation 1336), and this may include reducing the image quality of the transmitted video stream when the present count is less than a first count threshold. Therefore, when the transmission bandwidth is continuously insufficient for transmitting the video stream with the present image quality setting, the image quality of the video stream can be reduced to decrease the required transmission bandwidth. Subsequently, the receiving terminal can receive the video stream normally, which leads to smooth real-time playing of the video stream.

When the present count is increased to a larger value, this may mean that the present bandwidth is sufficient for transmitting the video stream with the present image quality setting, and the image quality of the transmitted video stream can be enhanced to provide users a better watching experience. Hence, the image quality of the transmitted video stream is adjusted according to the present count (operation 1336), and this may include enhancing the image quality of the transmitted video stream when the present count is more than a second count threshold. Therefore, when the transmission bandwidth is continuously sufficient for transmitting the video stream with the present image quality setting, the image quality of the video stream can be enhanced to provide users of the receiving terminal a better watching experience.

The routine 100 of FIG. 1 may further include an operation of generating a warning signal when the received number of frames is zero. Hence, users can be notified of transmission abnormalities with the warning signal. In addition, a receiving operation at the receiving terminal can be stopped after the warning signal is received thereby.

Figure 6:
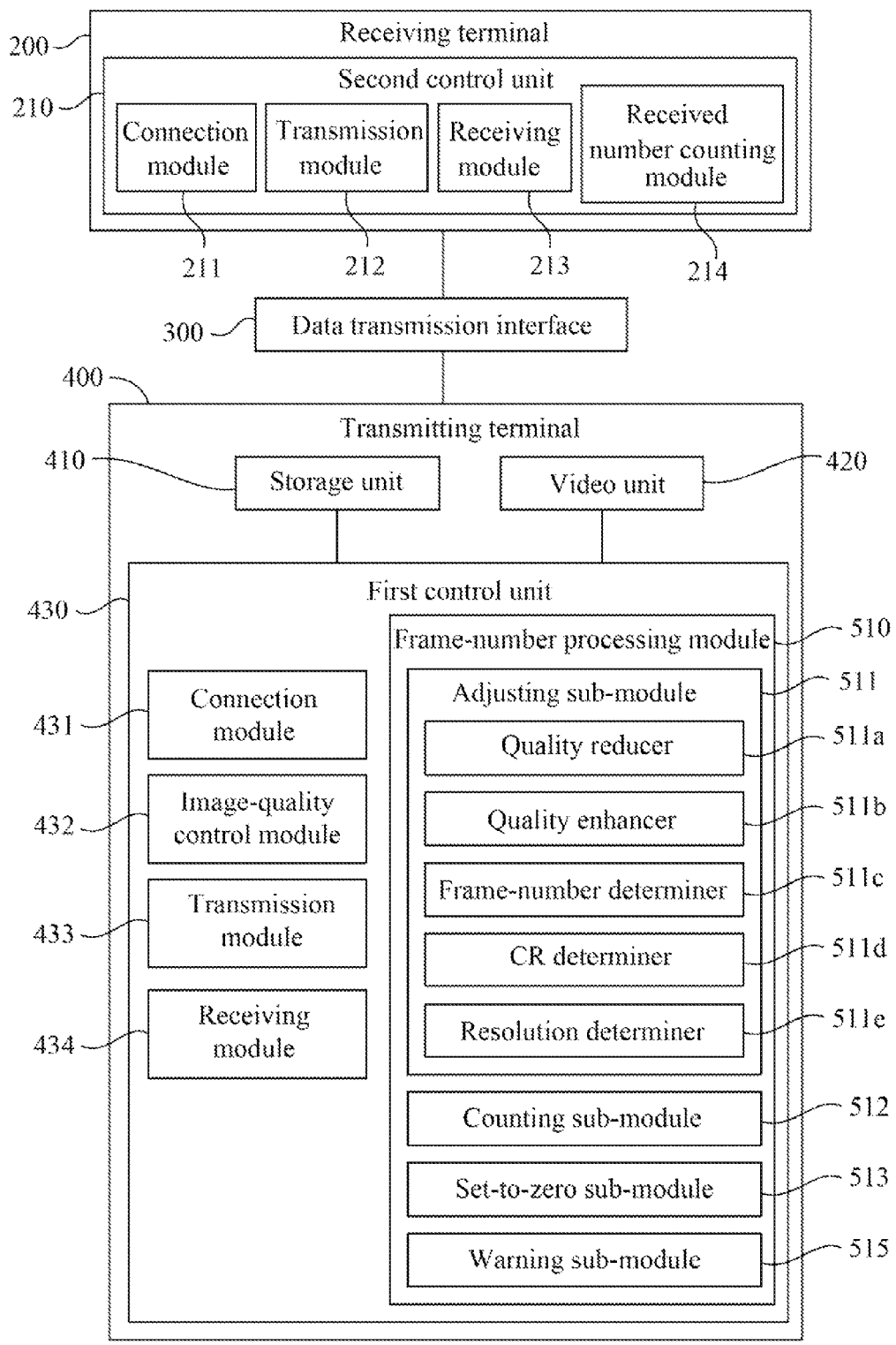
FIG. 6 illustrates a block diagram of a video transmitting system with an image quality adjusting function according to an embodiment of this invention.

Referring to FIG. 6, a block diagram will be described that illustrates a video transmitting system with an image quality adjusting function according to an embodiment of this invention. In the video transmitting system, the image quality of the transmitted video stream is adjusted according to the number of frames received by a receiving terminal in a preset period.

The video transmitting system includes a receiving terminal 200, a transmitting terminal 400 and a frame-number processing module 510. In one embodiment of this invention, the frame-number processing module 510 is installed in a first control unit 430 of the transmitting terminal 400.

The first control unit 430 of the transmitting terminal 400 includes a connection module 431 and an image-quality control module 432. The connection module 431 establishes a connection with a connection module 211 of a second control unit 210 of the receiving terminal 200 through a data transmission interface 300. The connection module 431 drives a transmission module 433 of the first control unit 430 to transmit a video stream to the receiving terminal 200, and a receiving module 213 of the second control unit 210 receives the transmitted video stream. The data transmission interface 300 may utilize WiFi®, 3rd generation (3G) mobile telecommunications, Universal Serial Bus (USB®) or any other wired or wireless data transmission protocol to transmit data.

The image-quality control module 432 adjusts an image quality of the transmitted video stream transmitted by the transmitting terminal 400. The image quality of the video stream may be adjusted by the image-quality control module 432 in terms of its resolution, CR, frame rate, GOP size, or a combination thereof, or any other image-quality related parameter of the video stream and combinations thereof. In one embodiment of this invention, the transmitting terminal 400 may further include a video unit 420 electrically connected to the first control unit 430. The video stream transmitted by the transmitting terminal 400 may be filmed utilizing the video unit 420. In another embodiment of this invention, the transmitting terminal 400 may further include a storage unit 410. Hence, the transmitting terminal 400 may transmit the video stream stored in the storage unit 410. A received number counting module 214 of the second control unit 210 of the receiving terminal 200 may count the received number of frames of the video stream received by the receiving terminal every preset period. Subsequently, a transmission module 212 of the second control unit 210 can transmit the received number of frames of the receiving terminal 200 to the receiving module 434 of the first control unit 430 of the transmitting terminal 400.

The frame-number processing module 510 includes an adjusting sub-module 511. The adjusting sub-module 511 drives the image-quality control module 432 of the transmitting terminal 400 to adjust the image quality of the video stream according to the received number of frames of the video stream received by the receiving terminal 200 in a preset period. Therefore, if the receiving terminal 200 receives a sufficient number of frames of the video stream in a preset period or not, the image quality of the transmitted video stream can be adjusted according to the result thereof.

In one embodiment of this invention, the frame-number processing module 510 may utilize several counts as a basis for adjusting the image quality of the video stream. Hence, the frame-number processing module 510 may further include a counting sub-module 512. When the received number of frames is less than a lower boundary for the number of frames, the counting sub-module 512 increases a first count. When the received number of frames is more than an upper boundary for the number of frames, the counting sub-module 512 increases a second count. Furthermore, a set-to-zero sub-module 513 of the frame-number processing module 510 may set the second count to zero when the counting sub-module 512 increases the first count. In addition, the set-to-zero sub-module 513 may set the first count to zero when the counting sub-module 512 increases the second count. In some embodiments, if the received number of frames is not received for a period of time, it may be determined that a transmission abnormality has occurred at the receiving terminal 200, and the counting sub-module 512 increases the first count. In some other embodiments, if the received number of frames is not received, the adjusting sub-module 511 may set the received number of frames to zero to make the received number of frames less than the lower boundary of the number of frames. Subsequently, the counting sub-module 512 may increase the first count when the received number of frames is less than the lower boundary of the number of frames. Hence, the adjusting sub-module 511 can drive the image-quality control module 432 of the transmitting terminal 400 to adjust the image quality of the video stream according to the first count and the second count. Therefore, the frame-number processing module 510 can determine if the receiving terminal 200 receives a sufficient number of frames continually in a period of time according to the first count and the second count for the image quality adjustment. In addition, the first count and the second count may respectively represent the continuous count numbers with insufficient and sufficient received number of frames, and the image quality adjustment can be made according to counts thereof.

When the first count is increased to a larger value, this may mean that the present bandwidth is insufficient for transmitting the video stream with the present image quality setting, and the image quality of the transmitted video stream should be reduced to decrease the required transmission bandwidth. Hence, the adjusting sub-module 511 may include a quality reducer 511a. The quality reducer 511a may drive the image-quality control module 432 to reduce the image quality of the video stream when the first count is more than a first count threshold. Therefore, when the transmission bandwidth is continuously insufficient for transmitting the video stream with the present image quality setting, the image quality of the video stream can be reduced to decrease the required transmission bandwidth. Subsequently, the receiving terminal 200 can receive the video stream normally, which leads to smooth real-time playing of the video stream.

When the second count is increased to a larger value, this may mean that the present bandwidth is sufficient for transmitting the video stream with the present image quality setting, and the image quality of the transmitted video stream can be enhanced to provide users at the receiving terminal 200 a better watching experience. Hence, the adjusting sub-module 511 may include a quality enhancer 511b. When the second count is more than a second count threshold, the quality enhancer 511b may drive the image-quality control module 432 to enhance the image quality of the video stream. Therefore, when the transmission bandwidth is continuously sufficient for transmitting the video stream with the present image quality setting, the image quality of the video stream can be enhanced to provide users at the receiving terminal 200 a better watching experience.

In another embodiment of this invention, the frame-number processing module 510 may determine if the received number of frames is higher than an upper boundary or lower than a lower boundary and adjust the image quality according to the determination result thereof. Hence, the adjusting sub-module 511 may further include a frame-number determiner 511c. The frame-number determiner 511c determines if the received number of frames is less than a lower boundary for the number of frames and determines if the received number of frames is more than an upper boundary for the number of frames. When the received number of frames is less than the lower boundary, the quality reducer 511a drives the image-quality control module 432 of the transmitting terminal 400 to reduce the image quality of the video stream. When the received number of frames is more than the upper boundary, the quality enhancer 511b drives the image-quality control module 432 to enhance the image quality of the video stream. Hence, the image quality of the transmitted video stream can be dynamically adjusted according to the received number of frames.

In another embodiment of this invention, the frame-number processing module 510 may utilize a single count for adjusting the image quality of the video stream. Hence, the frame-number determiner 511c may determine if the received number of frames is less than a lower boundary for the number of frames and determine if the received number of frames is more than an upper boundary for the number of frames. When the received number of frames is less than the lower boundary, the counting sub-module 512 decreases a present count and selects the smaller value between the decreased present count and a first initial count as the present count. When the received number of frames is more than the upper boundary, the counting sub-module 512 increases the present count and selects the larger value between the increased present value and a second initial count as the present count. Subsequently, the adjusting sub-module 511 drives the image-quality control module 432 to adjust the image quality of the video stream according to the present count.

When the present count is decreased to a smaller value, this may mean that the present bandwidth is insufficient for transmitting the video stream with the present image quality setting, and the image quality of the transmitted video stream should be reduced to decrease the required transmission bandwidth. Hence, when the present count is less than a first count threshold, the quality reducer 511a drives the image-quality control module 432 to reduce the image quality of the transmitted video stream. Therefore, when the transmission bandwidth is continuously insufficient for transmitting the video stream with the present image quality setting, the image quality of the video stream transmitted by the transmitting terminal 400 can be reduced to decrease the required transmission bandwidth. Subsequently, the receiving terminal 200 can receive the video stream normally, which leads to smooth real-time playing of the video stream.

When the present count is increased to a larger value, this may mean that the present bandwidth is sufficient for transmitting the video stream with the present image quality setting, and the image quality of the transmitted video stream can be enhanced to provide users a better watching experience. Hence, when the present count is more than a second count threshold, the quality enhancer 511b drives the image-quality control module 432 to enhance the image quality of the transmitted video stream. Therefore, when the transmission bandwidth is continuously sufficient for transmitting the video stream with the present image quality setting, the transmitting terminal 400 can transmit the video stream with enhanced image quality to provide users of the receiving terminal 200 a better watching experience.

The frame-number processing module 510 may adjust the image quality is of the video stream by adjusting the CR and resolution. Hence, the adjusting sub-module 511 may further include a CR determiner 511d and a resolution determiner 511e. The resolution determiner 511e determines the present resolution of the transmitted video stream. When decreasing the image quality of the video stream, the CR determiner 511d determines if the present CR of the video stream is equal to a CR minimum of a present resolution of the video stream. When the present CR is not equal to the CR minimum of the present resolution, the quality reducer 511a drives the image-quality control module 432 to decrease the present CR of the video stream. When the present CR is equal to the CR minimum of the present resolution, the quality reducer 511a drives the image-quality control module 432 to decrease the present resolution of the video stream and adjust the present CR to reduce the transmitted video data size of the video stream. The bandwidth required for transmitting the video stream after resolution reduction and CR adjustment is less than that for transmitting the video stream before reduction and adjustment thereof.

When enhancing the resolution of the video stream, the I frame size of the video stream after resolution enhancement may be further taken into consideration. Hence, when enhancing the image quality of the video stream, the CR determiner 511d determines if the present CR of the video stream is equal to a CR maximum of a present resolution of the video stream. When the CR determiner 511d determines that the present CR is not equal to the CR maximum, the quality enhancer 511b drives the image-quality control module 432 to increase the present CR. When the present CR is equal to the CR maximum, the quality enhancer 511b drives the image-quality control module 432 to increase the present resolution of the video stream and adjust the present CR. A first I frame data size of the video stream before increasing the present resolution and adjusting the present CR is substantially equal to a second I frame data size of the video stream after such increasing and adjusting. Therefore, the situation in which there is insufficient bandwidth for transmitting the I frame, the data size of which may be increased significantly after the resolution augmentation and CR adjustment, can be avoided, and the transmitted video stream can be played smoothly.

The frame-number processing module 510 may reference a table to obtain an adjustment setting for adjusting the image quality. Hence, the adjusting sub-module 511 may reference an image-setting table according to the received number of frames and a present image setting of the video stream to obtain an image adjustment setting and may drive the image-quality control module 432 to adjust the image quality of the video stream according to the image adjustment setting. In one embodiment of this invention, the image-setting table can be configured according to the determination method of the CR determiner 511d. In other embodiments, the image-setting table can be configured with different combinations of resolution, CR, frame rate or GOP size to be referenced for the image-quality adjustment, which should not be limited in this disclosure.

When the received number of frames is zero, a warning sub-module 515 of the frame-number processing module 510 generates a warning signal. Hence, users can be notified of transmission abnormalities with the warning signal. In addition, a receiving operation at the receiving terminal 200 can be stopped after the warning signal is received thereby.

Figure 7:
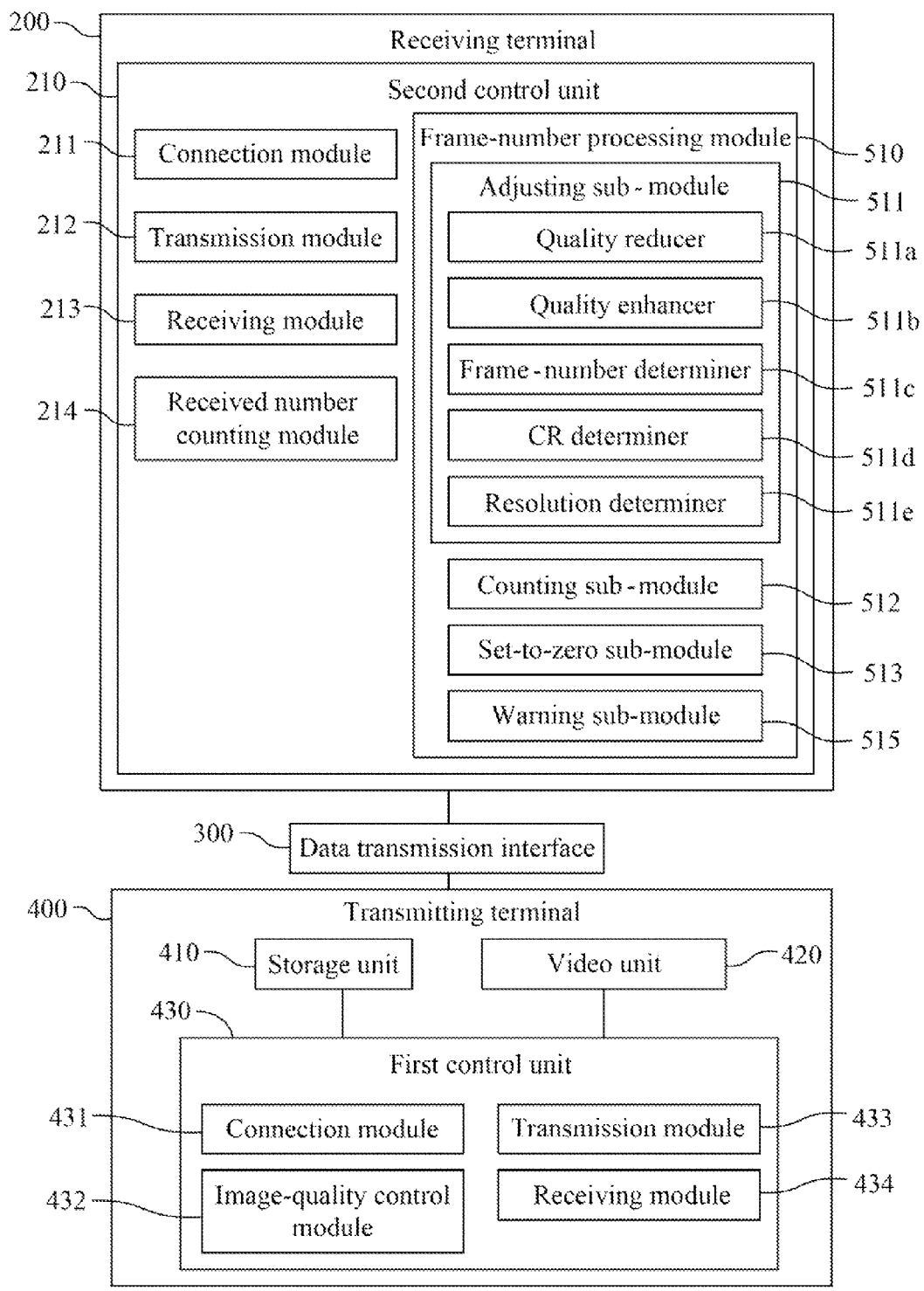
FIG. 7 illustrates a block diagram of a video transmitting system with an image quality adjusting function according to another embodiment of this invention.

Referring to FIG. 7, a block diagram will be described that illustrates a video transmitting system with an image quality adjusting function according to another embodiment of this invention. It is noted that the portion of the description mentioned above, namely, the portion that applies also to this embodiment, will not be repeated. The receiving terminal 200 may include a second control unit 210. The frame-number processing module 510 may be installed in the second control unit 210 to adjust the image quality of the video stream, which is transmitted by the transmitting terminal 400.

The present invention can achieve many advantages. Whether the number of frames is sufficient or not can be determined according to the received number of frames of the transmitted video stream received by the receiving terminal in a preset period, and the image quality of the transmitted video stream can be dynamically adjusted according to the result thereof. When the received number of frames is determined to be insufficient, the image quality of the transmitted video stream can be reduced to decrease the required transmission bandwidth. Hence, the receiving terminal can receive the video stream normally, which leads to smooth real-time playing of the video stream. When the received number of frames is determined to be sufficient, the image quality of the transmitted video stream can be enhanced, which can provide users of the receiving terminal a better watching experience. In addition, image quality adjustment may be realized without having to ascertain the available bandwidth for transmission, such that better image quality can be provided to users without delay during playing of the video stream in real-time.

Although the present invention has been described in considerable detail with reference to certain embodiments thereof, other embodiments are possible. Therefore, the spirit and scope of the appended claims should not be limited to is the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A video transmitting method with an image quality adjusting function comprising: transmitting a video stream to a receiving terminal; obtaining a received number of frames of the video stream received by the receiving terminal in a preset period; and adjusting an image quality of the video stream according to the received number of frames, wherein the operation of adjusting the image quality of the video stream according to the received number of frames comprises: determining if the received number of frames is less than a lower boundary for the number of frames; increasing a first count when the received number of frames is less than the lower boundary; determining if the received number of frames is more than an upper boundary for the number of frames; increasing a second count when the received number of frames is more than the upper boundary; and adjusting the image quality of the video stream according to the first count and the second count.

2. The video transmitting method with an image quality adjusting function of claim 1 further comprising: dynamically adjusting the upper boundary or the lower boundary for the number of frames.

3. The video transmitting method with an image quality adjusting function of claim 1 further comprising: increasing the first count when the received number of frames is not obtained.

4. The video transmitting method with an image quality adjusting function of claim 1 further comprising: setting the received number of frames to zero when the received number of frames is not obtained.

5. The video transmitting method with an image quality adjusting function of claim 1 further comprising: setting the second count to zero when increasing the first count; and setting the first count to zero when increasing the second count.

6. The video transmitting method with an image quality adjusting function of claim 1, wherein the operation of adjusting the image quality of the video stream according to the received number of frames comprises:
    determining if the received number of frames is less than a lower boundary for the number of frames;
    reducing the image quality of the video stream when the received number of frames is less than the lower boundary;
    determining if the received number of frames is more than an upper boundary for the number of frames; and
    enhancing the image quality of the video stream when the received number of frames is more than the upper boundary.

7. The video transmitting method with an image quality adjusting function of claim 1, wherein the operation of adjusting the image quality of the video stream according to the received number of frames comprises:
    determining if the received number of frames is less than a lower boundary for the number of frames;
    when the received number of frames is less than the lower boundary, decreasing a present count and selecting the smaller value between the decreased present count and a first initial count as the present count;
    determining if the received number of frames is more than an upper boundary for the number of frames;
    when the received number of frames is more than the upper boundary, increasing the present count and selecting the larger value between the increased present value and a second initial count as the present count; and
    adjusting the image quality of the video stream according to the present count.

8. The video transmitting method with an image quality adjusting function of claim 1, wherein the operation of adjusting the image quality of the video stream according to the received number of frames comprises:
    reducing the image quality of the video stream; and
    enhancing the image quality of the video stream.

9. The video transmitting method with an image quality adjusting function of claim 8, wherein the operation of reducing the image quality of the video stream comprises:
    determining if a present compressed ratio (CR) of the video stream is equal to a CR minimum of a present resolution of the video stream;
    decreasing the present CR of the video stream when the present CR is not equal to the CR minimum of the present resolution; and
    decreasing the present resolution of the video stream and adjusting the present CR when the present CR is equal to the CR minimum of the present resolution.

10. The video transmitting method with an image quality adjusting function of claim 8, wherein the operation of enhancing the image quality of the video stream comprises:
    determining if a present CR of the video stream is equal to a CR maximum of a present resolution of the video stream;
    increasing the present CR of the video stream when the present CR is not equal to the CR maximum; and
    increasing the present resolution of the video stream and adjusting the present CR when the present CR is equal to the CR maximum, such that a first Intra-frame (I frame) data size before increasing the present resolution and adjusting the present CR is substantially equal to a second I frame data size after the increasing and adjusting operations.

11. The video transmitting method with an image quality adjusting function of claim 1, wherein the operation of adjusting the image quality of the video stream comprises:
    adjusting a resolution of the video stream, CR, frame rate of the video stream, size of group of pictures (GOP) of the video stream or a combination thereof.

12. The video transmitting method with an image quality adjusting function of claim 1, wherein the operation of adjusting the image quality of the video stream according to the received number of frames comprises:
    referencing an image-setting table according to the received number of frames and a present image setting of the video stream to obtain an image adjustment setting; and
    adjusting the image quality of the video stream according to the image adjustment setting.

13. The video transmitting method with an image quality adjusting function of claim 1 further comprising:
    generating a warning signal when the received number of frames is zero.

14. A video transmitting system with an image quality adjusting function comprising: a receiving terminal; a transmitting terminal comprising: a first control unit comprising: a connection module for establishing a connection with the receiving terminal through a data transmission interface and transmitting a video stream to the receiving terminal; and an image-quality control module for adjusting an image quality of the transmitted video stream; and a frame-number processing module comprising: an adjusting sub-module for driving the image-quality control module of the transmitting terminal to adjust the image quality of the video stream according to a received number of frames of the video stream received by the receiving terminal in a preset period, wherein the frame-number processing module further comprises: a counting sub-module for increasing a first count when the received number of frames is less than a lower boundary for the number of frames, and increasing a second count when the received number of frames is more than an upper boundary for the number of frames, wherein the adjusting sub-module drives the image-quality control module of the transmitting terminal to adjust the image quality of the video stream according to the first count and the second count.

15. The video transmitting system with an image quality adjusting function of claim 14, wherein the counting sub-module increases the first count when the received number of frames is not obtained.

16. The video transmitting system with an image quality adjusting function of claim 14, wherein the adjusting sub-module sets the received number of frames to zero when the received number of frames is not obtained.

17. The video transmitting system with an image quality adjusting function of claim 14, wherein the frame-number processing module further comprises: a set-to-zero sub-module for setting the second count to zero when increasing the first count and setting the first count to zero when increasing the second count.

18. The video transmitting system with an image quality adjusting function of claim 14, wherein the adjusting sub-module comprises:
a frame-number determiner for determining if the received number of frames is less than a lower boundary for the number of frames and determining if the received number of frames is more than an upper boundary for the number of frames;
a quality reducer for driving the image-quality control module of the transmitting terminal to reduce the image quality of the video stream when the received number of frames is less than the lower boundary; and
a quality enhancer for driving the image-quality control module of the transmitting terminal to enhance the image quality of the video stream when the received number of frames is more than the upper boundary.

19. The video transmitting system with an image quality adjusting function of claim 14, wherein the adjusting sub-module comprises:
a frame-number determiner for determining if the received number of frames is less than a lower boundary for the number of frames and determining if the received number of frames is more than an upper boundary for the number of frames,
wherein a present count is decreased and the smaller value between the decreased present count and a first initial count is selected as the present count when the received number of frames is less than the lower boundary,
wherein the present count is increased and the larger value between the increased present value and a second initial count is selected as the present count when the received number of frames is more than the upper boundary,
wherein the adjusting sub-module drives the image-quality control module of the transmitting terminal to adjust the image quality of the video stream according to the present count.

20. The video transmitting system with an image quality adjusting function of claim 14, wherein the adjusting sub-module comprises:

a quality reducer for driving the image-quality control module of the transmitting terminal to reduce the image quality of the video stream; and
a quality enhancer for driving the image-quality control module of the transmitting terminal to enhance the image quality of the video stream.

21. The video transmitting system with an image quality adjusting function of claim 20, wherein the adjusting sub-module further comprises:
a CR determiner for determining if a present CR of the video stream is equal to a CR minimum of a present resolution of the video stream when decreasing the image quality of the video stream,
wherein the quality reducer drives the image-quality control module of the transmitting terminal to decrease the present CR of the video stream when the present CR is not equal to the CR minimum of the present resolution,
wherein the quality reducer drives the image-quality control module of the transmitting terminal to decrease the present resolution of the video stream and adjust the present CR when the present CR is equal to the CR minimum of the present resolution.

22. The video transmitting system with an image quality adjusting function of claim 20, wherein the adjusting sub-module further comprises:
a CR determiner for determining if a present CR of the video stream is equal to a CR maximum of a present resolution of the video stream when enhancing the image quality of the video stream,
wherein the quality enhancer drives the image-quality control module of the transmitting terminal to increase the present CR of the video stream when the present CR is not equal to the CR maximum,
wherein the quality enhancer drives the image-quality control module of the transmitting terminal to increase the present resolution of the video stream and adjust the present CR when the present CR is equal to the CR maximum, such that a first I frame data size before increasing the present resolution and adjusting the present CR is substantially equal to a second I frame data size after the increasing and adjusting operations.

23. The video transmitting system with an image quality adjusting function of claim 14, wherein the transmitting terminal further comprises:
a video unit electrically connected to the first control unit, wherein the video unit is configured to film the video stream.

24. The video transmitting system with an image quality adjusting function of claim 14, wherein the transmitting terminal further comprises a storage unit, and the video stream is stored in the storage unit.

25. The video transmitting system with an image quality adjusting function of claim 14, wherein:
the adjusting sub-module references an image-setting table according to the received number of frames and a present image setting of the video stream to obtain an image adjustment setting and drives the image-quality control module of the transmitting terminal to adjust the image quality of the video stream according to the image adjustment setting.

26. The video transmitting system with an image quality adjusting function of claim 14, wherein the frame-number processing module further comprises:
a warning sub-module for generating a warning signal when the received number of frames is zero.

27. The video transmitting system with an image quality adjusting function of claim 14, wherein the frame-number processing module is installed in the first control unit of the transmitting terminal.

28. The video transmitting system with an image quality adjusting function of claim 14, wherein the receiving terminal comprises a second control unit, and the frame-number processing module is installed in the second control unit of the receiving terminal.

* * * * *